United States Patent Office 2,935,485
Patented May 3, 1960

2,935,485
OIL EXTENDED RUBBER COMPOSITIONS STABILIZED WITH MAGNESIUM SALTS

Richard J. Reynolds, Walnut Creek, Calif., assignor to Shell Oil Company, a corporation of Delaware No Drawing. Application June 28, 1956
Serial No. 594,374

8 Claims. (Cl. 260—23.7)

This invention relates to a rubber composition. More particularly, the invention pertains to a useful composition containing vulcanizable rubber mixed with an extending oil and contaminated with an iron salt, which composition is effectively inhibited against oxidative degradation.

Beneficial processing characteristics obtained by mixing vulcanizable or raw rubber with oil as an extender or softener. These oils are usually derived from petroleum. In recent years, so-called "cold rubber" has been processed and used by incorporation therein of extending oil. Most cold rubber is manufactured by polymerization at low temperature (5° C.) in aqueous emulsion of a conjugated diene, usually in conjunction with another monomer such as styrene, using an organic hydroperoxide as initiator and a ferrous pyrophosphate as activator. This cold rubber is contaminated with residual iron salts from the activator. Although excellent vulcanizates may be prepared from oil extended cold rubber, oxidative degradation of the extended raw rubber has long been a serious problem, especially when the extending oil is what was designated by the Office of Synthetic Rubber of the Reconstruction Finance Corporation (R.F.C.) as an aromatic or highly aromatic oil. The oxidative degradation is manifested during drying, storage, mastication and heat aging by pronounced decreases of molecular weight and increases in plasticity, tack and gel content.

Many attempts have heretofore been made to overcome this oxidative degradation with little success. Thus it has been proposed to prepare the rubbery butadiene-styrene copolymer using a recipe containing only a minute amount of iron. While effective, the recipe is not as reliable as the pyrophosphate recipe in that die outs, slow polymerization rates, etc. occur and most cold rubber is therefore produced commercially using the pyrophosphate recipe. It has also been proposed to add a chelating agent for the iron such as Versene Fe-3 to the oil extended rubber blend, but this gives only temporary stabilization which does not persist on prolonged aging to which product may be subjected.

It is therefore an object of the present invention to provide means for effectively inhibiting oxidative degradation of oil extended rubber containing iron salt or like contaminants. Another object is to provide aromatic and highly aromatic oils containing the stabilizer which is adapted for blending with rubber containing iron salt or equivalent contaminants. Other objects will be apparent from the description of the invention.

I have now discovered that a rubber composition effectively inhibited against oxidative degradation is obtained by incorporating a magnesium salt of an organic acid of at least 6 carbon atoms with a mixture of vulcanizable rubber contaminated with a salt of iron or like multivalent metal capable of existing in two valence states, and a compatible oil softener for the rubber. As little as 20 parts of metal of the contaminating salt per million of the rubber cause appreciable oxidative degradation, probably by catalytic action, but the added magnesium salt effectively inhibits the degradation both at such low metal content and at many times the stated amount. Thus it is not unusual to have present in the oil extended rubber such amounts as 200 to 1000 or more parts of metal as contaminating salt per million of rubber. Nevertheless the magnesium inhibitor of the invention effectively suppresses the expected oxidative degradation.

The magnesium salts employed as stabilizers in the composition of the invention are of most varied type. In general, they are salts of any organic acid having at least 6 carbon atoms. They need only have a magnesium atom linked to an oxygen atom which in turn is linked to a carbon atom of the organic acid. The organic acid has a dissociation constant in water at 25° C. preferably of from about $10^{-3}$ to $10^{-12}$. The acidic group of the acid is either a carboxylic acid group or a phenolic group. If desired, both groups may be present as well as a plurality of either or both. The stabilizers thus include a magnesium salt of an organic acid of at least 6 carbon atoms which is a carboxylic acid or a phenol. However, the action of magnesium salts of organic acids containing carboxylic acid groups exclusively, particularly salts of monocarboxylic acids, is much better than the salts of phenols, and the former are therefore preferred. The presence or absence of saturation or unsaturation or of substituents atoms or groups in the organic acid salts is immaterial since it is the magnesium which provides the stabilizing effect. Typical magnesium salts of carboxylic acids include magnesium salts of caproic acid, caprylic acid, 2-ethylhexoic acid, capric acid, lauric acid, myristic acid, palmitic acid, stearic acid, arachidic acid, behenic acid, azelaic acid, pelargonic acid, sebacic acid, oleic acid, linoleic acid, linolenic acid, ricinoleic acid, chaulmoogric acid, dihydroxystearic acid, chlorostearic acid, nitro-lauric acid, aminostearic acid, mercaptoricinoleic acid, benzoic acid, toluic acid, p-tert-butylbenzoic acid, salicylic acid, diisopropylsalicylic acid, cerrylanthrylic acid, naphthenic acid, phthalic acid, adipic acid, sebacic acid, tetrahydrobenzoic acid, rosin acid, disproportionated rosin acid, hydrogenated rosin acid, abietic acid and the like. Generally, the carboxylic acids contain 12 to 25 carbon atoms. Magnesium salts of mixtures of carboxylic acids are suitable. Among representative magnesium salts of phenols are salts of cresol, octylphenol, tert-butylcatachol, and the many phenol-aldehyde condensates containing phenolic hydroxyl groups such as phenol-formaldehyde novolac resins, isobutylphenol-acetaldehyde resin, chlorophenol-formaldehyde resin, tert-butylphenol-formaldehyde resin, tert-octylphenol-formaldehyde resin, and the like. The magnesium salts may be either neutral salts or so-called basic or ultrabasic salts as known in the art. Furthermore, magnesium need not be the sole metal constituent of the salt. Other metals may be present in combination as is the case with mixed magnesium and calcium or potassium salts obtained from dolomite, carnallite, asbestos and the like.

The rubber constituent of the composition is of any type that is vulcanizable with sulfur. The rubber or elastomer is usually an unsaturated sulfur-vulcanizable rubbery organic polymer including natural rubber, reclaimed rubber, synthetic rubber or mixtures thereof. The magnesium salts are particularly effective for stabilizing against oxidative degradation of synthetic rubber which are vulcanizable rubbery polymers of a conjugated diene, preferably of up to 8 carbon atoms. These are exemplified by homopolymer of butadiene, isoprene, 2-methylpentadiene-1,3, 2-methylpentadiene-2,4, piperylene, 2- furylbutadiene-1,3, 2-methoxybutadiene-1,3, 2-cyanobutadiene-1,3, 2-chlorobutadiene-1,3, 2-bromobutadiene-1,3, 2,3-dimethylbutadiene-1,3, 2-phenylbutadiene-1,3 and the like as well as copolymers of one or more of conjugated dienes, or of one or more dienes with one or more monoolefinic compounds including arylolefins such as styrene, methylstyrene, α-methylstyrene, chlorostyrene, p-methoxystyrene, vinylnaphthalene and the like; acrylic and substituted acrylic acids and their esters, nitriles and amides such as acrylic acid, methacrylic acid, methyl acrylate, ethyl acrylate, methyl alpha-chloro-acrylate, methyl methacrylate, ethylmethacrylate, butyl methacrylate, methyl ethacrylate, acrylonitrile, methacrylonitrile, vinylidene cyanide and the like; and unsaturated aldehydes, ketones, etc. such as isobutylene, isoamylene, methyl vinyl ketone, methyl isopropenyl ketone, acrolein, methacrolein, methyl vinyl ether, vinylethinyl alkyl carbinol, vinyl acetate, vinyl chloride, vinylidene chloride, vinylfurane, vinylpyridine, 2-methyl-5-vinylpyridine, vinylcarbazole, vinylacetylene and other unsaturated hydrocarbons, esters, alcohols, acids, ethers, etc. The copolymers generally contain a major proportion of bound conjugated diene although this is not necessarily always true since Butyl rubbers that are copolymers containing isobutylene, isoamylene, etc. with a minor amount of butadiene, isoprene, etc. are included. The invention is very suitable with butadiene-styrene copolymer containing a weight ratio of butadiene to styrene of 50:50 to 85:15. The method used in forming the polymers is not important and they may be natural polymers (Hevea or Ficus rubber), aqueous emulsion polymer, mass polymer such as made by polymerizing using metallic sodium, lithium, alfin catalysts, borontrifluoride, aluminum chloride, etc. Mixtures of different rubbers may be used in the composition.

The metal salts contaminating the rubber and causing the oxidative degradation are salts of one or more of a variety of metals. A serious offender is an iron salt although salts of other multivalent metals capable of existing in two valence states also have their ability to cause degradation effectively suppressed by the added magnesium salt of an organic acid. Such other multivalent metals include manganese, cobalt, copper, vanadium, chromium, nickel, and the like, all of which are oxidation catalysts when present as salts. The acid portion of the salts is probably most varied, and in any event is not important. Since various emulsifiers are used for emulsion polymerization employing a redox recipe with a multivalent metal salt as activator, the metal may be combined as salt with the acids of the emulsifier acid. Further, in natural rubber, the metal may be present as salt by contamination from coagulation with acetic acid or the like in metal vessels. Furthermore, even in milling rubbery polymers the metal salt is derived from the metal rolls or other mixers.

The oil used as extender or softener in the composition is preferably of the usual type. These are ordinarily derived from petroleum although they may be from coal tar or any other suitable source. Generally, they have a viscosity of from about 10 cs. at 210° F. up to more or less solid materials softening at about 100 to 200° F., have a boiling point of at least 300° F. at 10 mm. Hg, and have a specific gravity (60/60° F.) of about 0.9 to 1.05. These are primarily higher hydrocarbons and may be vacuum distillates of petroleum as well as extracts and/or raffinates of such distillates. Also suitable are residues of petroleum distillation operations.

The principle of the invention is particularly effective for rubber extended with high boiling extracts of petroleum. These extract oils are materials well known in the art. The extracts are obtained by extracting petroleum with solvents having preferential selectivity for aromatics and naphthenes. To obtain such extracts, various non-reactive, highly polar, aromatically preferential solvents are used such as liquid sulfur dioxide, phenol, cresylic acid, furfural, beta,beta-dichloroethyl ether, nitrobenzene and the like. Combination solvents like phenol with cresylic acid, or liquid sulfur dioxide with benzene or toluene are sometimes used. The use of the so-called double solvent process employing mutually immiscible solvents such as phenol and propane give excellent extending oils. Many of such extracts are obtained as byproducts from manufacture of lubricating oils, and thus are commercially available in very large quantities. Particular reference is made to extracts from bulk vacuum distillate fractions or cuts from California, Mid-Continent or Gulf Coast crudes used in manufacturing lubricating oils by solvent refining methods. Especially suited are extending oils of this type known as highly aromatic oils and aromatic oils by R.F.C. According to the Rostler method of analysis (Ind. Eng. Chem. 41, 598 (1949)), such highly aromatic processing oils contain about 10 to 25% nitrogen bases extractable with 85% sulfuric acid, about 12 to 28% group I unsaturated hydrocarbons extractable with 97% sulfuric acid, about 15 to 40% group II unsaturated hydrocarbons extractable with 106.75% sulfuric acid, and about 5 to 15% saturated hydrocarbons. Likewise, such aromatic oils contain up to about 12% nitrogen bases, about 8 to 21% group I unsaturated hydrocarbons, about 48 to 65% group II unsaturated hydrocarbons and about 15 to 32% saturated hydrocarbons. Very suitable oils boil above about 300° F. at 10 mm. Hg pressure and contain at least 60% by weight of hydrocarbons extractable by sulfuric acid of about 95 to 110% strength after extraction of nitrogen bases by 85% sulfuric acid therefrom, the extractions being conducted at about 25° C.

The products of the invention are manufactured using several alternative methods. Perhaps the simplest method is merely to compound the constituents on a roll mill or in a Banbury or like mixer. For example, the rubber containing the contaminating metal salt is first milled on a heated roll mill, next the extending oil is added in usual fashion and compounded with the rubber, and then the stabilizing magnesium compound is incorporated. Preferably, the composition is prepared according to the masterbatching method wherein latex of the contaminated rubber is mixed with an aqueous emulsion or dispersion of the extender containing the stabilizing magnesium salt, and the mixture is coagulated and dried. If desired, an aqueous emulsion or dispersion of the magnesium salt may be separately prepared and combined with the latex and oil emulsion mixture followed by coagulation and drying. The coagulation of the mixtures is effected in usual fashion with acid, salt-acid, alum (aluminum sulfate), glue-acid, etc.

The vulcanizable rubber is ordinarily the major constituent of the composition and the extending oil the minor constituent. Excellent compositions are obtained using rubber having a plasticity measured as Mooney value or viscosity (ML–4 at 212° F.) of at least 80. More particular, rubbers such as GR–S have a Mooney viscosity of about 100 to 140. Although governed to some extent by the particular rubber and the character of the extending oil, the oil is generally used in amounts of from about 10 to 100 parts by weight of oil per 100 parts of rubber, particularly from about 20 to 50 parts of oil per 100 of rubber.

As with the proportion of extending oil, the amount of stabilizing magnesium salt may be varied over wide limits. Amounts of magnesium salt in the range of about 0.2 to 10% are usually satisfactory. The amount of salt is preferably governed by the amount of contaminating metal as salt in the composition. Good results are obtained with use of an amount of magnesium salt such that the composition contains at least one mole of magnesium per mole of contaminating metal, preferably about 2 to 3 or more moles of magnesium per mole of contaminating multivalent metal.

By mixing one or more of the magnesium salts with an extending oil, an excellent product is obtained for use in softening vulcanizable rubber contaminated with metal salt normally causing oxidative degradation of the extended rubber. Since extending oils of high aromatic content are most prone to give serious oxidative degradation with the contaminated rubber, the products are prepared from an oil, preferably from petroleum, having an initial boiling point above 300° F. at 10 mm. Hg pressure, and containing at least 60% by weight of hydrocarbon extractable by sulfuric acid of about 95 to 130% strength after first extracting the nitrogen bases from the oil by 85% sulfuric acid. The extractions are conducted at about 25° C. The extractions with the strong sulfuric acid may be conducted step-wise as in the Rostler method first with 97% acid, and then with oleum. The nitrogen base content of the oil is from about 3 to 25 or 30% by weight.

The mixture of oil and magnesium salt is easily prepared by intermixing heated oil and salt. For this purpose, the salt is heated to liquefying temperature, if necessary, such as about 50 to 150° C. or higher, and the oil is similarly heated. The salt is then added to the oil with agitation. The amount of magnesium salt added may be varied considerably, usually the amount is governed primarily by the need for stabilizing the contaminated rubber. Ordinarily about 1 to 10% is suitable. It is preferred that the type of magnesium salt and the amount not be so high that solidification of the mixture occurs at ordinary temperature. For this reason, use of magnesium salts of naphthenic acids are particularly preferred, especially with the aromatic oils.

The compositions of the invention are very useful. The oil-magnesium salt mixtures enable ready preparation of the compositions containing the contaminated rubber. The stabilized rubber compositions are suitable for manufacture of all types of fabricated rubber articles. For this purpose, the usual other compounding ingredients are incorporated such as sulfur, vulcanization accelerators, fillers, reinforcers, carbon black and the like. It is noteworthy that the presence of the magnesium salt in the composition has no adverse effect on the properties of the vulcanizates and they may be used for such articles of commerce as tires, tire treads, belting, hoses, gaskets, etc.

The invention is illustrated but not limited by the examples given below. In the examples, reference is made to several extending oils, namely, Dutrex 20 and SE2-1271, highly aromatic oils, and Shell SPX-97, an aromatic oil, all from Shell Oil Company. Properties of the oils are given in the following tabulation. The composition of the oils was determined according to the Rostler method (Ind. Eng. Chem. 41, 598 (1949)).

|  | Dutrex 20 | SE2-1271 | Shell SPX-97 |
|---|---|---|---|
| Specific Gravity, 60° F./60° F. | 1.04 | 0.993 | 0.980 |
| Viscosity at 210° F., SUS | 106 | 195 | 85 |
| Composition, Percent: |  |  |  |
| Asphaltenes | 0.0 | 0.1 | 0.0 |
| Nitrogen Bases | 21.9 | 11.7 | 9.0 |
| Unsat. HC, Group I | 26.4 | 21.4 | 18.7 |
| Unsat. HC, Group II | 45.9 | 53.2 | 52.1 |
| Sat. HC | 5.8 | 13.6 | 20.2 |

Also, in the examples reference is made to synthetic rubber 1712 latex, the base latex used in producing GR-S 1712 which is normally prepared for sale as masterbatch rubber containing 37.5 parts by weight of highly aromatic oil extender per 100 parts of latex solids (rubber). The 1712 latex is produced by copolymerizing butadiene-1,3 and styrene in aqueous emulsion at 5° C. to give a high Mooney polymer containing about 23.5% bound styrene using p-menthane hydroperoxide as initiator and iron pyrophosphate as activator. The latex also contained about 1.2% of a usual heat stabilizer, phenyl-beta-naphthyl amine, which was ineffective in preventing the oxidative degradation.

Further in the examples, the additive (magnesium salt stabilizer or other salt for comparison) was first mixed with the extending oil and the mixture emulsified using the following recipe wherein the parts are by weight.

|  | Parts |
|---|---|
| Oil | 750 |
| Additive | As required |
| Oleic acid | 15 |
| 1% NaOH solution | 172 |
| Distilled water | 578 |

The oil containing the additive, if any, and oleic acid were heated to about 95° C. and agitated by a stirrer. The distilled water containing the dilute caustic, also heated to about 95° C., was slowly added with mild agitation until the mixture became thick and pasty (inversion point). At this point, addition of aqueous caustic was stopped and the mixture agitated violently to take advantage of the high viscosity to produce greater shearing action and finer particle size. The addition of caustic was then completed and the resulting emulsion cooled to room temperature.

The oil emulsion was blended with the latex in such a proportion to give a coagulated product containing 37.5 parts by weight of oil per 100 parts of latex solids. The mixture was creamed by vigorous agitation at room temperature using brine containing 10% sodium chloride, and employing about 35 parts of salt per 100 parts of latex solids and oil. The creamed mixture was coagulated by addition of 0.25% aqueous sulfuric acid to a pH of 4.0. The serium was then removed and the coagulum washed with distilled water. The coagulum, separated by filtration on stainless steel screen, was dried in a forced draft oven at 60° C. in a 4-8 hour period, care being used to remove the coagulum as soon as dry. The dry coagulum was then extruded through a spaghetti die to give uniform shreds about 0.09 inch thick. Aging stability was determined by measuring the Mooney viscosity (ML-4, 212° F.) before and after heating the shreds in a forced draft air oven at 60° C. for the indicated times. There are indications that one day aging at 60° C. may be equivalent to about 120 days aging at room temperature (25° C.).

*Example 1*

Using the procedure described above, 1712 latex was masterbatched with Dutrex 20, a highly aromatic oil, containing the metal salts tabulated below. The oil-rubber samples in being derived from a ferrous pyrophosphate recipe had a high content of iron, analysis showing the presence of about 550 p.p.m. (parts per million). In the following table, the amount of the metal salt present is given in p.h.r. (parts per hundred of rubber product containing oil and other solids) along with the moles of metal in the salt per million parts of rubber product (m.p.m.). The compositions were aged for 72 hours in air at 60° C. The percent viscosity retention refers to the change in Mooney viscosity before and after heat aging.

| Metal Salt | Amount, p.h.r. | Metal, m.p.m. | Mooney Viscosity Initial | Mooney Viscosity After 72 Hrs. | Percent Viscosity Retention |
|---|---|---|---|---|---|
| None | 0.0 | 0.0 | 44 | 11 | 25 |
| Magnesium Stearate | 1.05 | 18.4 | 57 | 59 | 103 |
| Aluminum Stearate | 1.05 | 12.4 | 57 | 20 | 35 |
| Calcium Naphthenate | 1.23 | 23.5 | 59.5 | 30.5 | 51 |
| Lead Stearate | 1.05 | 14.1 | 60 | 23.5 | 39 |
| Stannous Oleate | 0.60 | 8.8 | 54.5 | 22 | 40 |

The outstanding ability of the magnesium salt compared to related metal salts in preventing oxidative degradation manifested by loss in viscosity is self-evident from the above results.

Example 2

That the cause of degradation of the rubber-oil mixtures is due to iron contained in the polymer will be clear from the results of this example. By using a peroxamine recipe, GR-S 2101 latex may be prepared containing a very small amount of iron. An oil masterbatch containing no added magnesium salt was prepared as described above from the 2101 latex and Dutrex 20. Another sample was prepared containing ferrous sulfate purposely added to the latex. Stability tests at 60° C. for 3 days and analyses for iron were run on the samples. The results are tabulated below along with the blank run given in Example 1.

| Latex | Iron in p.p.m. | Mooney Viscosity | | Percent Viscosity Retention |
|---|---|---|---|---|
| | | Initial | After 72 Hrs. | |
| 2101 | 12 | 80 | 97 | 121 |
| 2101+Fe | 514 | 85 | 32.5 | 38 |
| 1712 | 550 | 44 | 11 | 25 |

Example 3

Magnesium resinate made from rosin and containing 3.15% magnesium was tested as a degradation stabilizer for 1712 latex masterbatched with Shell SPX-97, an aromatic oil. The magnesium salt was used in the amounts of percent by weight tabulated below.

| Percent Mg Salt | Mooney Viscosity after— | | | | Percent Retention After 7 Days |
|---|---|---|---|---|---|
| | 0 Day | 3 Days | 5 Days | 7 Days | |
| None | 52 | 28 | 17.5 | 12 | 23 |
| 0.40 | 52.5 | 51.5 | 47.5 | 46 | 88 |
| 0.79 | 54.5 | 55 | 51 | 49.5 | 91 |
| 1.32 | 54 | 55.5 | 52 | 40.5 | 75 |

Example 4

A stabilizing salt was prepared by neutralizing crude refinery naphthenic acid bottoms with dolomite. The salt contained 0.52% magnesium and 0.99% calcium. It was used to stabilize the product obtained by masterbatching 1712 latex with SE2-1271, a highly aromatic oil. A 15% solution of the salt in the oil was first prepared so there was 4.1% of the salt present in the rubber-oil product. Aging tests at 60° C. were conducted on the product. It was found that the product underwent a reduction of Mooney viscosity of from 57 to 52 or 91% retention of Mooney viscosity in 3 days at 60° C. A control sample containing no salt suffered a reduction of from 53 to 28.5 or 54% retention in like time.

Example 5

This example will illustrate the stabilizing action obtained by compounding or milling a magnesium salt with an iron-contaminated rubber and an extending oil. The example further illustrates that the stabilizing action occurs independently of the presence of an organic antioxidant such as phenyl-beta-naphthylamine.

The rubber used was a sample of GR-S 1710 latex to which no organic anti-oxidant was added. The butadiene-styrene copolymer of this latex had been prepared using an iron pyrophosphate recipe similar to that used for preparation of 1712 latex. The 1710 latex was masterbatched with Dutrex 20 extending oil containing no magnesium salt stabilizer. Coagulation was effected with salt and acid, and the rubber-oil mixture, containing 37.5 parts of oil per hundred parts of rubber, was dried as described in the above examples. The extended rubber was divided into samples. One sample was retained as a blank. Another had 4 parts by weight of the dolomite salt of naphthenic acid described in Example 4 incorporated with 100 parts of rubber by brief milling on a roll mill at 50° C. A third sample had a like amount of the magnesium salt incorporated after milling was effected at 50° C. to effect some break-down of the rubber composition. The three samples then were subjected to aging at 60° C. The results of Mooney viscosity measurements are tabulated below.

| Mg Salt Present | Milled 15 Min. at 50° C. | Mooney Viscosity After: | | | Percent Retention After 3 Days |
|---|---|---|---|---|---|
| | | 0 Day | 1 Day | 3 Days | |
| No | No | 68 | | 24 | 35 |
| Yes | No | 41 | 40.5 | 34 | 83 |
| Yes | Yes | 34 | 34 | 29.5 | 87 |

Example 6

Another batch of 1712 latex was masterbatched with samples of Dutrex 20 containing magnesium or dolomite naphthenate as well as naphthenate of several other metals for comparison. The compositions were then subjected to aging at 60° C. for 5 days time with the following results. The table also gives the analysis for iron in the products as well as the amount of naphthenate salt in parts per hundred of rubber product (p.h.r.) and the moles of metal as naphthenate salts per million parts of rubber product (m.p.m.).

| Naphthenate Salt of | Amt., p.h.r. | Metal, m.p.m. | Fe, p.p.m. | Mooney Viscosity | | Percent Viscosity Retention |
|---|---|---|---|---|---|---|
| | | | | Initial | After 5 Days | |
| None | 0.0 | 0.0 | 273 | 51 | 15.5 | 30 |
| Mg | 1.5 | 14.8 | 315 | 54 | 38.5 | 71 |
| Mg-Ca [1] | 4.0 | 5.4-12.5 | 280 | 54.5 | 44 | 81 |
| Ca | 1.6 | 18.6 | 276 | 48.5 | 16 | 33 |
| Al | 2.2 | 18.8 | 304 | 52 | 13.5 | 26 |
| Ba | 2.5 | 16.0 | 279 | 50 | 17 | 34 |
| Zn | 1.6 | 13.3 | 288 | 51 | 17 | 33 |

[1] Naphthenate salt of dolomite—0.52% Mg+0.99% Ca.

Example 7

This example will further illustrate the independent action of a magnesium salt from a usual organic antioxidant. A quantity of GR-S 1710 latex was used containing no phenyl-beta-naphthylamine or other organic antioxidant. Samples of the latex were masterbatched with two extending oils with and without magnesium resinate described in Example 3. One oil was Dutrex 20 and the other was Circosol 2XH, a naphthenic oil from Sun Oil Co., having a specific gravity (60/60° F.) of 0.95, a viscosity at 210° F., SUS, of 90, and a Rostler analysis of 1.0% nitrogen bases, 4.4% group I unsaturated hydrocarbons, 43.7% group II unsaturated hydrocarbons, and 50.9% saturated hydrocarbons. The compositions were aged at 60° C. with the following results.

| Oil | Mg Salt, p.h.r. | Mooney Viscosity After— | | | |
|---|---|---|---|---|---|
| | | 0 Day | 3 Days | 5 Days | 7 Days |
| Circosol 2XH | 0.0 | 64 | | | 41 |
| Circosol 2XH | 1.2 | 66 | | | 59 |
| Dutrex 20 | 0.0 | 68 | 24 | | |
| Dutrex 20 | 1.2 | 70 | | 62.5 | |

Like results are obtained with other magnesium salts and other extending oils in other rubbers containing iron salts or other contaminating multivalent metal salts.

I claim as my invention:

1. A rubber composition inhibited against oxidative degradation which comprises a vulcanizable rubbery polymer of conjugated diene prepared at a low temperature in an aqueous emulsion and in the presence of an iron salt, the iron salt being present in the rubbery polymer in an amount of from 200 to 1000 parts per million parts of rubbery polymer, 10 to 100 parts per 100 parts of rubbery polymer of a compatible petroleum oil softener having a boiling point above 300° F. at 10 mm. Hg pressure and viscosity varying from about 10 cs at 210° F. up to solid material softening at about 100° F. to 200° F., and from .2 to 10% of a magnesium salt of an acidic material of the group consisting of carboxylic acids containing from 6 to 25 carbon atoms and monohydric phenols.

2. A rubber composition inhibited against oxidative degradation which comprises a vulcanizable rubbery polymer of a conjugated diene containing up to 8 carbon atoms prepared at a low temperature in an aqueous emulsion and in the presence of an ion salt, the ion salt being present in the rubbery polymer in an amount varying from about 200 to 1000 parts per million parts of rubbery polymer, 10 to 100 parts per 100 parts of rubbery polymer of a compatible petroleum oil softener having a boiling point above 300° F. at 10 mm. Hg pressure and viscosity varying from about 10 cs at 210° F. up to solid material softening at about 100° F. to 200° F., and from .2 to 10% of a magnesium salt of a monocarboxylic acid containing from 6 to 25 carbon atoms.

3. A rubber composition inhibited against oxidative degradation which comprises a major amount of a vulcanizable rubbery polymer of a conjugated diene hydrocarbon of up to 6 carbon atoms prepared at a low temperature in an aqueous emulsion and in the presence of an iron salt, the iron salt being present in the rubbery polymer in an amount varying from about 200 to 1000 parts per million parts of rubbery polymer from 10 to 100 parts per 100 parts of rubbery polymer of a compatible petroleum oil boiling above about 300° F. at 10 mm. Hg pressure and containing at least 60% by weight of hydrocarbons extractable by sulfuric acid of about 95 to 130% strength after extraction of nitrogen bases by 85% sulfuric acid therefrom the extractions being conducted at about 25° C., and from .2 to 10% of a magnesium salt of a carboxylic acid containing from 6 to 25 carbon atoms.

4. A rubber composition as defined by claim 1 wherein the polymer is a copolymer of butadiene and styrene containing a minor proportion of bound styrene units in the copolymer chain.

5. A rubber composition as defined by claim 1 wherein the magnesium salt is magnesium stearate.

6. A rubber composition as defined by claim 1 wherein the magnesium salt is magnesium naphthenate.

7. A rubber composition as defined by claim 1 wherein the magnesium salt is magnesium resinate.

8. A rubber composition as defined by claim 1 wherein the magnesium salt is the calcium-magnesium salt of dolomite and naphthenic acid.

References Cited in the file of this patent

UNITED STATES PATENTS

| 2,453,880 | Vanderbilt et al. | Nov. 16, 1948 |
| 2,477,336 | Jennings | July 26, 1949 |
| 2,711,401 | Lally | June 21, 1955 |

FOREIGN PATENTS

| 152,872 | Australia | Oct. 23, 1951 |
| 684,155 | Great Britain | Dec. 10, 1952 |

OTHER REFERENCES

Davis and Blake, Chemistry and Technology of Rubber, page 47, Reinhold (1937).

Chemical Abstracts, vol. 34 (1940), page 2640, abstract of article by Wentworth.

Role of Soap in the Rubber Program, Rubber Age, 52, pages 235–6 (1942).

Elliot: The Alkaline Earth and Heavy Metal Soaps, pp. 282–285, Reinhold (1946).

J. Rubber Research 16, pp. 195–196 (1947).

Barron: Modern Rubber Chemistry, p. 52, D. Van Nostrand (1948).

Boner: Manf. and Appl. of Lubricating Grease, pp. 576–578, 581, Reinhold (1954).

Whitby: Synthetic Rubber, pp. 538, 541–542, John Wiley, (1954).

Bovey et al.: Emulsion Polymerization, pages 71–81, Interscience Pub., New York (1955).